(12) United States Patent
Kamizono et al.

(10) Patent No.: US 8,040,241 B2
(45) Date of Patent: *Oct. 18, 2011

(54) CAPACITANCE-BASED OCCUPANT DETECTION SYSTEM AND OCCUPANT PROTECTION SYSTEM

(75) Inventors: Tsutomu Kamizono, Nagoya (JP); Shoichi Yamanaka, Anjo (JP); Shinichi Kiribayashi, Anjo (JP); Masahiro Ishikawa, Toyohashi (JP)

(73) Assignee: Denso Corporation, Kariya (JP)

( * ) Notice: Subject to any disclaimer, the term of this patent is extended or adjusted under 35 U.S.C. 154(b) by 399 days.

This patent is subject to a terminal disclaimer.

(21) Appl. No.: 12/070,539

(22) Filed: Feb. 19, 2008

(65) Prior Publication Data

US 2008/0198024 A1    Aug. 21, 2008

(30) Foreign Application Priority Data

Feb. 21, 2007   (JP) .................................. 2007-041214

(51) Int. Cl.
*G08B 13/26* (2006.01)

(52) U.S. Cl. ........ 340/561; 340/562; 340/563; 340/540; 340/500; 701/45; 280/735; 280/734

(58) Field of Classification Search ............... 340/425.5, 340/457.1, 438, 562, 561, 541, 540, 500; 701/45; 280/735, 734
See application file for complete search history.

(56) References Cited

U.S. PATENT DOCUMENTS

| | | | | |
|---|---|---|---|---|
| 6,025,711 A * | 2/2000 | Demma et al. | ............ | 324/207.26 |
| 6,392,542 B1 * | 5/2002 | Stanley | ............ | 340/561 |
| 7,148,792 B2 * | 12/2006 | Takafuji et al. | ............ | 340/436 |
| 2003/0222656 A1 * | 12/2003 | Phillips et al. | ............ | 324/605 |
| 2005/0228597 A1 * | 10/2005 | Giurgiutiu et al. | ............ | 702/35 |
| 2005/0253712 A1 * | 11/2005 | Kimura et al. | ............ | 340/562 |
| 2005/0275202 A1 | 12/2005 | Wato et al. | | |
| 2006/0164254 A1 | 7/2006 | Kamizono et al. | | |
| 2007/0194900 A1 * | 8/2007 | Hawkins et al. | ............ | 340/457.1 |
| 2007/0252584 A1 * | 11/2007 | Imamura et al. | ............ | 324/158.1 |

FOREIGN PATENT DOCUMENTS

| | | | |
|---|---|---|---|
| JP | 09-301119 | | 11/1997 |
| JP | 11-271463 | | 10/1999 |
| JP | 2006-027591 | | 2/2006 |
| JP | 2006027591 A | * | 2/2006 |
| JP | 2006-201129 | | 8/2006 |
| JP | 2006-242907 | | 9/2006 |

OTHER PUBLICATIONS

U.S. Appl. No. 11/977,139, filed Oct. 23, 2007, Kiribayashi.

* cited by examiner

*Primary Examiner* — Daniel Wu
*Assistant Examiner* — Son M Tang
(74) *Attorney, Agent, or Firm* — Harness, Dickey & Pierce, PLC

(57) ABSTRACT

A capacitance-based occupant detection system accurately determines seat occupancy and a failure of an electrode and between electrodes and includes an impedance calculation section, a Re/Im part calculation section, and a determination section. A first impedance Z1 is calculated including a main-body impedance Za between a main electrode and a vehicle body. The Re/Im part calculation section calculates real and imaginary parts of the first impedance Z1 based on the first impedance Z1 calculated by the impedance calculation section. The determination section determines the presence or absence of destruction of the main electrode and a guard electrode based on an imaginary part of the first impedance Z1 calculated by the Re/Im part calculation section.

10 Claims, 8 Drawing Sheets

CAPACITANCE-BASED OCCUPANT DETECTION SYSTEM AND OCCUPANT PROTECTION SYSTEM

CROSS REFERENCE TO RELATED APPLICATIONS

The present invention is based on and claims priority to Unpublished Japanese Patent Application No. 2007-41214 filed on Feb. 21, 2007 the entire contents of which are incorporated herein by reference.

BACKGROUND OF THE INVENTION

1. Field of the Invention

The present invention relates to a detection system and a protection system and, more specifically, to detection of sitting on a seat by the detection system and control of a protection system for protecting an occupant in a vehicle.

2. Description of the Related Art

A typical occupant detection system includes, for example, a capacitance-based sensor and an electronic control unit (ECU). A low intensity electric field is generated between a main electrode inside a seat and a vehicle body. A typical capacitance-based sensor outputs disturbances in the electric field as an electric current or voltage as described for example in JP-H11-271463 A.

Other capacitance-based sensors can detect wetness of a seat to more clearly determine whether an occupation sits on the seat or the seat is vacant as described for example, in JP-2006-27591 A.

Still other capacitance-based sensors can reduces a current flowing between a pair of electrodes used for occupant determination when a set is vacant as described for example, in JP-2006-201129 A. When an occupant sits on a vehicle seat, the sensor can clearly detect a current flowing between the pair of electrodes. Such a capacitance-based sensor is provided with a new guard electrode for capacity reduction.

A capacitor is formed between the guard electrode for capacity reduction and the main electrode provided in the seat for occupant determination. The sensor detects a current flowing through the capacitor and detects its failure based on a detected current value as described for example, in JP-2006-242907 A.

However, despite the above described capabilities, conventional detection technology has limitations in that many types of failures cannot be detected. For example, conventional capacitance-based occupant detection sensors cannot determine whether an electrode included in the sensor has failed due to, for example, breakage or whether a failure has occurred between the electrodes due to, for example, saturation of the seat with a large amount of water. Since the above noted failures affect occupant detection, the sensor and thus the detection system output becomes unreliable.

A conventional capacitance-based sensor outputs an electric current or voltage indicating the disturbance of an electric field generated between electrodes. Different levels of currents or voltages are generated based on the electrical relationship between the electrodes depending on whether an occupant sits on the seat, whether the occupant is identified, or whether wetting and failure occurs. The sensor determines failures based on a current or voltage value, the sensed value.

However, the sensed value is output as a value associated with resistance components of circuits included in the capacitance-based sensor along with capacitance components between specified electrodes. That is, the capacitance-based sensor detects the sensed value between the electrodes as a value subject to the influence of the resistance components of the circuits. The resistance components include resistance values based on, for example, an occupant, water, air, and the like, which may be present between electrodes. Specifically, a human body, water, or other quantities present between electrodes can be modeled as a complex impedance that is equivalent to a parallel circuit including a resistor and a capacitor.

The capacitance-based sensor detects a current between the electrodes and uses a current value to determine the presence of an occupant, a failure, and so on. Specifically, the detected current value contains a value of the current passing through the parallel circuit including the resistor and the capacitor used between the electrodes. Limitations are placed on the determination ability of the sensor by simply using the current as the determinative value. Conventionally, the pure capacitance between electrodes is not strongly considered in connection with the determinative value of the sensed quantity, leading to barriers in improving the accuracy for determining seat conditions.

SUMMARY OF THE INVENTION

The present invention has been made in consideration of the foregoing. It is therefore an object of the present invention to provide a capacitance-based occupant detection system capable of accurately determining a failure of an electrode and between electrodes. It is another object of the present invention to provide an occupant protection system capable of preventing malfunctions due to failures and accurately controlling an occupant protection apparatus.

A capacitance-based occupant detection system according to various exemplary embodiments, includes a power supply section, a main electrode, a main wiring section, a guard electrode, an impedance calculation section, a Re/Im (Re/Im) part calculation section, a failure determination section, and an occupant determination section. The power supply section generates an AC voltage. The main electrode is provided for a vehicle seat. The main wiring section connects the power supply section with the main electrode. The guard electrode is provided between a seat frame electrically connected to a vehicle ground and the main electrode apart from and opposite to the main electrode. The guard electrode prevents an electric field from being formed between the seat frame and the main electrode.

The invention uses an occupant detection mode that ensures an equal electric potential for the main electrode and the guard electrode and generates an electric field between the main electrode and the vehicle body electrically connected to the vehicle ground. In other words, the occupant detection mode determines the presence of an occupant on the seat. In the description to follow, the vehicle body is assumed to be electrically connected to the vehicle ground.

In an occupant detection mode, the impedance calculation section calculates a first impedance containing a main-body impedance between the main electrode and the vehicle body. The Re/Im part calculation section calculates real and imaginary parts of the first impedance. The failure determination section determines the presence or absence of a failure such as destruction of the main electrode or a short circuit between the main electrode and the guard electrode based on the imaginary part calculated by the Re/Im part calculation section.

The occupant determination section determines the presence or absence of an occupant on the seat in accordance with a determination result of the failure determination section. The occupant determination includes considerations about whether or not an occupant sits on the seat and, if so, whether the occupant is adult or child, or a child restraint system (CRS) is used. For example, the occupant determination section may be configured to determine the presence or absence of an occupant based on data about above-mentioned failures or may be specifically configured not to determine the presence or absence of an occupant depending on failure data.

An occupant detection ECU may contain the impedance calculation section, the Re/Im part calculation section, the failure determination section, and the occupant determination section. The electrode destruction signifies breakage anywhere in the electrode itself or disconnection of a wire-shaped electrode.

Effects of the invention will be described below. The power supply section applies AC voltage to the main electrode via the main wiring section and generates an electric field between the main electrode and the vehicle body. The impedance calculation section calculates an impedance of a circuit containing both electrodes, such as an impedance ranging from the power supply section, the main wiring section, and the main electrode to the vehicle body. That is, the impedance calculation section calculates a first impedance containing a main-body impedance between the main electrode and the vehicle body. The Re/Im part calculation section calculates real and imaginary parts of the calculated first impedance.

According to various exemplary embodiments, the main-body impedance includes a capacitor including the main electrode and the vehicle body as an electrode. The main-body impedance varies with capacitor states such as the presence of a seated occupant, electrode failures, and the like. The invention calculates the first impedance containing the main-body impedance and uses its imaginary part to determine the presence or absence of a failure.

The imaginary part is equivalent to a capacitance component in the impedance. The real part is equivalent to a resistance component in the impedance. Conventionally, a current flowing through electrodes has been used as an element for determining the presence of an occupant, failures and the like. A current value is influenced by not only capacitance components between electrodes but also resistance components for the entire circuit including resistance components between the electrodes. By contrast, in the present embodiment, the imaginary part of an impedance equivalent to the capacitance component between the electrodes and uses the imaginary part is calculated as a determinative value. That is, in accordance with various embodiments, the imaginary part of the first impedance containing the main-body impedance can be calculated such that a capacitance component between both electrodes can be more accurately calculated than in the prior art.

Since the presence or absence of failures is determined based on the imaginary part, it is possible to more accurately determine the presence or absence of destruction of the main electrode or a short circuit between the main electrode and the guard electrode. When the main electrode is destroyed, for example, an operative area of the main electrode reduces. This signifies reduction of the area of the capacitor including the main electrode and the vehicle body. Accordingly, the imaginary part of the calculated first impedance decreases. In accordance with various exemplary embodiments, a failure of an individual electrode or of the operation between electrodes can be accurately determined. Further, the above-mentioned failures can be determined while in the occupant detection mode without changing the failure detection mode. That is, accurate failure determination can be continuously performed.

The occupant determination section can use the following methods. Current values can be used as determinative values. Alternatively, the imaginary part and real part of the first impedance can be used as a determinative value as mentioned above. The former method can further be used to provide a detection section, such as an ammeter, for detecting a current value between the main electrode and the vehicle body. In the occupant detection mode, the occupant determination section may determine an occupant based on a detected current value. The method using the real and imaginary parts can unify the failure determination section and the occupant determination section into one determination section. That is, either method can use the real and imaginary parts as determinative values and allow one determination section to determine a failure and an occupant.

Further, it is preferable that the failure determination section determines the presence or absence of destruction of the main electrode or a short circuit between the main electrode and the guard electrode based on the real part calculated by the Re/Im part calculation section. The failure determination section uses separate real and imaginary parts to determine the presence or absence of destruction of the main electrode or a short circuit between the main electrode and the guard electrode. Further, when determinative values include not only the imaginary part but also the real part, the determination accuracy improves. The real part of the first impedance is equivalent to the resistance component of the first impedance containing the main-body impedance. Accordingly, the resistance component affects the determination of failures and the like.

It is preferable to predetermine an imaginary part threshold value indicating a boundary between failure and normal states. In the occupant detection mode, the failure determination section determines destruction of the main electrode or a short circuit between the main electrode and the guard electrode when the imaginary part of the first impedance calculated by the Re/Im part calculation section is smaller than a predetermined imaginary part threshold value. Accordingly, whether a failure occurs with regard to an individual electrode or a failure occurs between electrodes can be more easily and clearly determined in the occupant detection mode.

A capacitance-based occupant detection system according to various exemplary embodiments includes a power supply section, a main electrode, a main wiring section, a guard electrode, an impedance calculation section, a Re/Im part calculation section, a failure determination section, and an occupant determination section. The failure determination section determines excessive wetting of the seat based on the real part of the first impedance calculated by the Re/Im part calculation section.

The invention can detect a change in the first impedance in the occupant detection mode when, for example, a seating surface section of a seat between the electrodes or between the main electrode and the vehicle body, is excessively wet. Based on the real part, the invention can determine the presence or absence of the excessive seat wetting while in the occupant detection mode.

Further, it is desirable that the failure determination section can determine the presence or absence of the excessive seat wetting based on the imaginary part calculated by the Re/Im part calculation section. That is, the failure determination section uses separate real and imaginary parts to determine the presence or absence of the excessive seat wetting. The determination accuracy further improves when determinative values include not only the real part but also the imaginary part.

A real part threshold value indicating a boundary between failure and normal states should be predetermined. In the occupant detection mode, the failure determination section determines excessive seat wetting when the real part of the first impedance calculated by the Re/Im part calculation section is greater than or equal to a predetermined real part threshold value. The presence of excessive set wetness can be more easily and clearly determined.

The Re/Im part calculation section calculates the real part of the first impedance as a real upper bound when a range of calculating the real part is settled and the real part of the first impedance exceeds the real upper bound of the range. The real part threshold value is set to the real upper bound. Settling a range of calculating the real part signifies predetermining a range of the real part to be calculated by the Re/Im part calculation section. When the real part of the first impedance to be calculated exceeds the real upper bound for the range, the Re/Im part calculation section calculates the real part as the real upper bound.

In addition, the real part threshold value is set to the real upper bound. When the real part of the first impedance exceeds the real upper bound, the real part is calculated as the real upper bound equivalent to the real part threshold value. When the real part of first impedance exceeds the real upper bound, the calculated real part becomes greater than or equal to the real part threshold value. The failure determination section determines that the seat is excessively wet.

When the seat is excessively wet, the first impedance real part is expected to exceed the range, up to the real upper bound, predetermined for the Re/Im part calculation section. In such a case, the failure determination section determines the wetting to be so excessive that the real part of the first impedance exceeds the real upper bound, making it possible to clearly determine the excessive seat wetting and simplify settings for the failure determination section.

A capacitance-based occupant detection system according to various exemplary embodiments may be constructed as follows when a sub electrode is provided for wetting detection. The capacitance-based occupant detection system may include a power supply section, a main electrode, a main wiring section, a sub electrode, an impedance calculation section, a Re/Im part calculation section, a failure determination section, and an occupant determination section. The sub electrode is provided apart from and adjacent to the main electrode.

The wetting detection mode is used for forming an electric field between the main electrode and the sub electrode. The wetting detection mode is used for determining the presence or absence of seat wetting. In the wetting detection mode, the impedance calculation section calculates a second impedance containing a main-sub impedance between the main electrode and the sub electrode. The Re/Im part calculation section calculates real and imaginary parts of the second impedance based on the second impedance calculated by the impedance calculation section. The failure determination section determines destruction of the main electrode, destruction of the sub electrode, or a short circuit between the main electrode and the guard electrode based on the imaginary part of the second impedance calculated by the Re/Im part calculation section.

In the wetting detection mode, the presence or absence of destruction of the main electrode, destruction of the sub electrode, or a short circuit between the main electrode and the guard electrode can be determined based on the imaginary part of the second impedance containing the main-sub impedance. In the wetting detection mode, the following methods can be used to determine wetting. One method is to use current values as determinative values. The other method is to use the imaginary part of the second impedance as a determinative value as mentioned above. Using current values can further provide a detection section, such as an ammeter, for detecting a current value between the main and sub electrodes. In the wetting detection mode, it may be advantageous to determine the wetting based on a detected current value. In connection with using the imaginary part, for example, the failure determination section can determine failures and wetting.

Further, the failure determination section determines the presence or absence of destruction of the main electrode, destruction of the sub electrode, or a short circuit between the main electrode and the guard electrode based on the real part calculated by the Re/Im part calculation section. The failure determination section uses separate real and imaginary parts to determine the presence or absence of the above-mentioned failures. The determination accuracy improves when determinative values include not only the imaginary part but also the real part.

An imaginary part threshold value indicating a boundary between failure and normal states should be determined or otherwise established or calculated. In the wetting detection mode, the failure determination section determines destruction of the main electrode, destruction of the sub electrode, or a short circuit between the main electrode and the guard electrode when the imaginary part of the second impedance calculated by the Re/Im part calculation section is smaller than a predetermined imaginary part threshold value. In this manner, the invention can more easily and clearly determine, while in the wetting detection mode, whether a failure has occurred in an individual electrode or between electrodes.

A capacitance-based occupant detection system according to various exemplary embodiments may include a power supply section, a main electrode, a main wiring section, a sub electrode, an impedance calculation section, a Re/Im part calculation section, a failure determination section, and an occupant determination section. The failure determination section determines the presence or absence of excessive seat wetting based on the real part of the second impedance calculated by the Re/Im part calculation section.

In the wetting detection mode, the presence or absence of the excessive seat wetting can be determined based on the real part of the second impedance when the seat is excessively wet. Further, it is advantageous that the failure determination section can determine the presence or absence of the excessive seat wetting based on the imaginary part calculated by the Re/Im part calculation section. That is, the failure determination section uses separate real and imaginary parts to determine the presence or absence of the excessive seat wetting. The determination accuracy further improves when determinative values include not only the real part but also the imaginary part.

A real part threshold value indicating a boundary between failure and normal states should be predetermined. In the wetting detection mode, the failure determination section determines excessive seat wetting when the real part of the second impedance calculated by the Re/Im part calculation section is greater than or equal to a predetermined real part threshold value. Accordingly, whether or not the seat is excessively wet can be more easily and clearly determined.

It is preferable that the Re/Im part calculation section calculates the real part of the second impedance as a real upper bound when a range of calculating the real part is settled and the real part of the second impedance exceeds the real upper bound of the range. It is further preferable that the real part threshold value is set to the real upper bound making it possible to clearly determine the excessive seat wetting and simplify settings for the failure determination section.

A capacitance-based occupant detection system according to various exemplary embodiments may include a power supply section, a main electrode, a main wiring section, a sub electrode, an impedance calculation section, a Re/Im part calculation section, a failure determination section, and an occupant determination section. The failure determination section determines the presence or absence of a short circuit between the main electrode and the sub electrode based on the real part or the imaginary part of the second impedance calculated by the Re/Im part calculation section.

In the wetting detection mode, the presence or absence of a short circuit between the main electrode and the sub electrode can be determined based on either one or both the real part and the imaginary part of the second impedance.

A real part threshold value indicating a boundary between failure and normal states should be predetermined. In the wetting detection mode, the failure determination section determines a short circuit between the main electrode and the sub electrode when the real part of the second impedance calculated by the Re/Im part calculation section is greater than or equal to a predetermined real part threshold value. Accordingly, the presence of the above-mentioned failures can be more easily and clearly determined.

The Re/Im part calculation section calculates the real part of the second impedance as a real upper bound when a range of calculating the real part is settled and the real part of the second impedance exceeds the real upper bound of the range. The real part threshold value is further set to the real upper bound making it possible to clearly determine excessive seat wetting and to simplify settings for the failure determination section.

An imaginary part threshold value indicating a boundary between failure and normal states should be predetermined. In the wetting detection mode, the failure determination section determines a short circuit between the main electrode and the guard electrode when the imaginary part of the second impedance calculated by the Re/Im part calculation section is greater than or equal to a predetermined imaginary part threshold value.

The determination accuracy can be further improved because above-mentioned failures can be determined using the imaginary part threshold value in addition to the real part threshold value.

The Re/Im part calculation section calculates the imaginary part of the second impedance as an imaginary upper bound when a range of calculating the imaginary part is settled and the imaginary part of the second impedance exceeds the imaginary upper bound of the range. The imaginary part threshold value is set to the imaginary upper bound making it possible to clearly determine a short circuit between the main electrode and the sub electrode and to simplify settings for the failure determination section.

A result of determining a presence or absence of an occupant or determining an electrode or sensor failure can be reflected in the occupant protection system, which can include the capacitance-based occupant detection system as described herein above and a control apparatus that controls an occupant protection apparatus. The occupant protection apparatus protects an occupant when a failure occurs, for example during an accident. An air bag can exemplify an occupant protection apparatus.

For example, the control apparatus enables or disables operations of the occupant protection apparatus based on a result of determining the presence and characteristics of an occupant or the like. The control apparatus can operate the occupant protection apparatus when it is enabled to operate.

For example, let us consider that the occupant protection apparatus is an air bag and the control apparatus is an air bag ECU. The air bag ECU enables or disables inflating of the air bag based on the determination result from the capacitance-based occupant detection system. Inflation of the air bag is enabled when the determination result shows that no failure is found and an occupant is detected. When an acceleration sensor or the like then detects a collision during such a state, the air bag ECU receives collision detection information and inflates the air bag.

In the occupant protection system according to various exemplary embodiments, the control apparatus can control the occupant protection apparatus based on accurate determination results. The system can prevent malfunctions due to electrode or seat sensor failures and accurately control the occupant protection apparatus.

The capacitance-based occupant detection system according to various exemplary embodiments can accurately determine a failure of an electrode and between electrodes. The occupant protection system according to various exemplary embodiments can prevent malfunctions due to failures and accurately control the occupant protection apparatus.

BRIEF DESCRIPTION OF THE DRAWINGS

Other objects, features and characteristics of the present invention will be appreciated and become apparent to those of ordinary skill in the art and all of which form a part of the present application. In the drawings.

DETAILED DESCRIPTION OF THE EXEMPLARY EMBODIMENTS

Embodiments of the capacitance-based occupant detection system according to the present invention will be described in further detail with reference to the accompanying drawings. An occupant protection system 100 includes a capacitance-based occupant detection system 1, an air bag ECU 16, which can correspond to a "control apparatus" in accordance with various embodiments, and an air bag 17, which can correspond to an "occupant protection apparatus" in accordance with various embodiments. That is, the embodiment describes the capacitance-based occupant detection system 1 applied to the occupant protection system 100.

Figure 1:
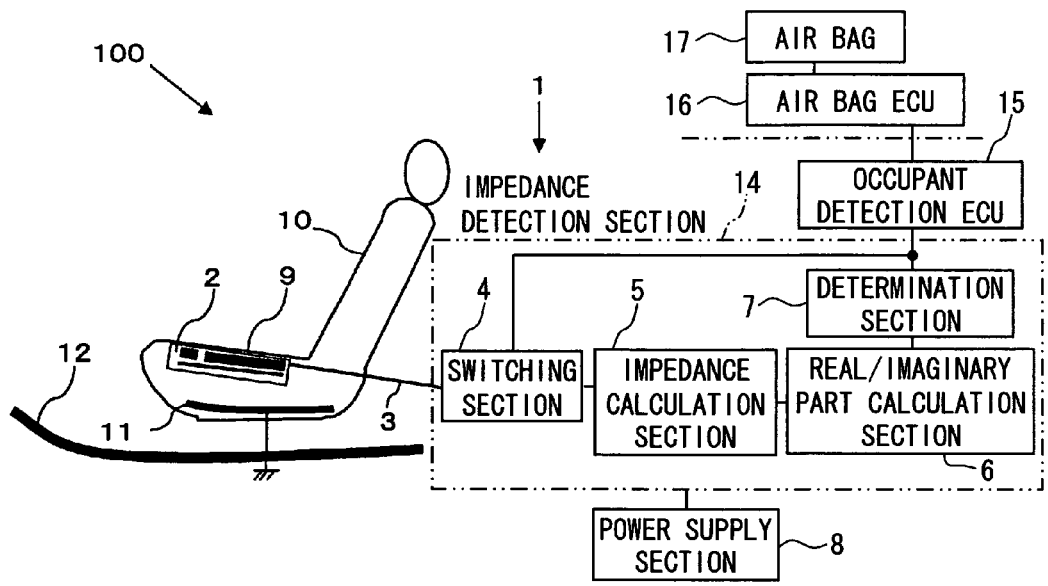
FIG. 1 is a block diagram illustrating a capacitance-based occupant detection system provided for a vehicle seat.
Figure 2:
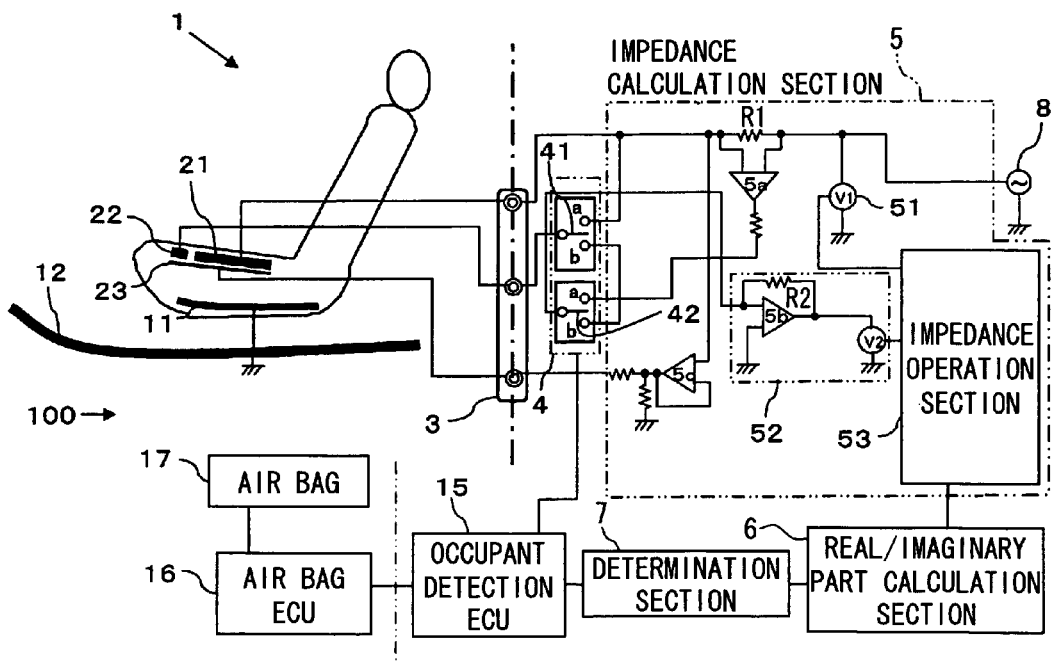
FIG. 2 is a schematic diagram illustrating of the system of FIG. 1.

The overall construction of the capacitance-based occupant detection system 1 can be described with reference to FIG. 1 and FIG. 2. FIG. 1 shows the capacitance-based occupant detection system 1 provided for a vehicle seat in block diagram form, while FIG. 2 contains a detailed circuit diagram of the system shown in FIG. 1. It should be noted that FIG. 2 specifically details a part of the system related to a switching section 4 and an impedance calculation section 5.

The vehicle seat includes a seating surface section 9, a backrest section 10, and a seat frame 11. The seating surface section 9 contains a sensor section 2. The seat frame 11 is provided at the bottom of the seat. The seat frame 11 is separated from and opposite to the sensor section 2. The seat frame 11 is electrically connected to a vehicle body 12 that is also electrically connected to a vehicle ground.

The capacitance-based occupant detection system 1 includes the sensor section 2, a connector section 3, a power supply section 8, and an impedance detection section 14, which can be referred to hereafter as Z detection section 14. The sensor section 2 is contained in the seating surface section 9 and has a main power supply 21, a sub power supply 22, and a guard electrode 23. That is, the main electrode 21 is contained in the seating surface section 9. The sub electrode 22 is separated from and is provided adjacent to the main electrode 21. The guard electrode 23 is provided opposite to the main electrode 21 and is provided between the main electrode 21 and the seat frame 11. The construction of the sensor section 2 will be described in greater detail hereinafter.

The connector section 3 connects the sensor section 2 and the Z detection section 14. The connector section 3 is generally provided to the rear of the seat and is connected to the sensor section 2. The connector section 3 may be partially provided in the seat. The construction of the connector section 3 will be described in greater detail hereinafter.

The power supply section 8 generates an alternating current (AC) voltage. The power supply section 8 applies an AC voltage to the main electrode 21. A wiring is used to connect the power supply section 8 with the main electrode 21 and is referred to as a main wiring section 28a as shown in FIG. 5.

The Z detection section 14 includes the switching section 4, the impedance calculation section 5, a Re/Im part calculation section 6, and a determination section 7, which can correspond to a failure determination section or an occupant determination section in accordance with various embodiments as described herein. As shown in FIG. 2, the switching section 4 includes two analog switches. That is, the switching section 4 includes a first switch 41 and a second switch 42. An occupant detection ECU 15 controls the switches 41 and 42 and is connected to the Z detection section 14. The switches 41 and 42 include common terminals and have a and b poles. The common terminals in each of the switches 41 and 42 can be switched to respectively side a or side b poles. The respective side a and side b poles of the switches 41 and 42 of switching section 4 are connected to the impedance calculation section 5.

The first switch 41 is connected to the sub electrode 22 at one end and to the side a or b pole at the other end. The second switch 42 is connected to a current detection section 52, to be described in greater detail hereinafter, in the impedance calculation section 5 at one end and to side a or b at the other end.

Each of the switches 41 and 42 is connected to side a or b pole according to a specified mode to be described. A circuit for the specified mode, also to be described, is formed by selecting connection states of the switches 41 and 42. The specified modes include "occupant detection mode" and "wetting detection mode." The modes will be described in more detail hereinafter.

The impedance calculation section 5 includes a current detection section 51, a first resistor R1, a first operational amplifier 5a, a current detection section 52, a third operational amplifier 5c, and an impedance operation section 53. The voltage detection section 51 detects an AC voltage of the power supply section 8. The resistor R1 is connected to the power supply section 8 at one end and to the main electrode 21 at side a pole of the first switch 41. The first operational amplifier 5a outputs a voltage difference at both ends of the first resistor R1. The current detection section 52 is connected to one end of the second switch 42. The third operational amplifier 5c connects the other end of the first resistor R1 with side a pole of the third switch 43. The current detection section 52 has a second operational amplifier 5b and a second resistor R2. The voltage detection section 51 and the current detection section 52 are electrically connected to the vehicle ground. Side b of the first switch 41 is connected to side b of the second switch in the impedance calculation section 5.

The impedance operation section 53 is connected to the voltage detection section 51 and the current detection section 52 at one end and to the Re/Im part calculation section at the other end. The impedance operation section 53 uses values detected by the voltage detection section 51 and the current detection section 52 to calculate a circuit impedance in the specified mode. That is, the impedance operation section 53 calculates a first impedance in the occupant detection mode and calculates a second impedance in the wetting detection mode, all of which will be described in greater detail hereinafter.

The Re/Im part calculation section 6 is connected to the impedance operation section 53 at one end and to the determination section 7 at the other end. The Re/Im part calculation section 6 uses an impedance calculated by the impedance calculation section 5 to calculate real and imaginary parts of the impedance. Specifically, the Re/Im part calculation section 6 calculates real and imaginary parts of the first impedance based on the first impedance in the occupant detection mode and calculates real and imaginary parts of the second impedance based on the second impedance in the wetting detection mode.

The determination section 7 is connected to the Re/Im part calculation section 6 at one end and to the occupant detection ECU 15 at the other end. The determination section 7 determines the presence of an occupant, wetting, and a failure based on values of the real and imaginary parts that are calculated by the Re/Im part calculation section 6 in the modes. According to the embodiment, the determination section 7 performs failure determination, occupant determination, and wetting determination. The failure determination is used to determine whether or not a failure occurs. The occupant determination is used to determine an occupant on the seat. The wetting determination determines whether or not the seat is wet. A determination result is transmitted to the occupant detection ECU 15 through a communication interface. The information is transmitted to the air bag ECU 16 from the occupant detection ECU 15. A determination result may be transmitted to the air bag ECU 16 without using the occupant detection ECU 15.

It may be preferable to directly transmit values of the real and imaginary parts in each mode to the air bag ECU 16 and to allow the air bag ECU 16 to perform the determination process. The air bag ECU 16 controls the air bag 17 based on the above-mentioned determination result and determines whether or not to inflate the air bag 17. An acceleration sensor (not shown) may detect a shock in an inflation-enabled state such as when a determination result shows no failure and an occupant is present. The air bag ECU 16 receives the acceleration sensor information and inflates the air bag 17. The process of the determination section in each mode will be described in greater detail hereinafter An operational circuit or an operational program is used to provide the impedance operation section 53, the Re/Im part calculation section 6, and the determination section 7. In addition, the Z detection section 14 may be provided in the occupant detection ECU 15.

Figure 3:
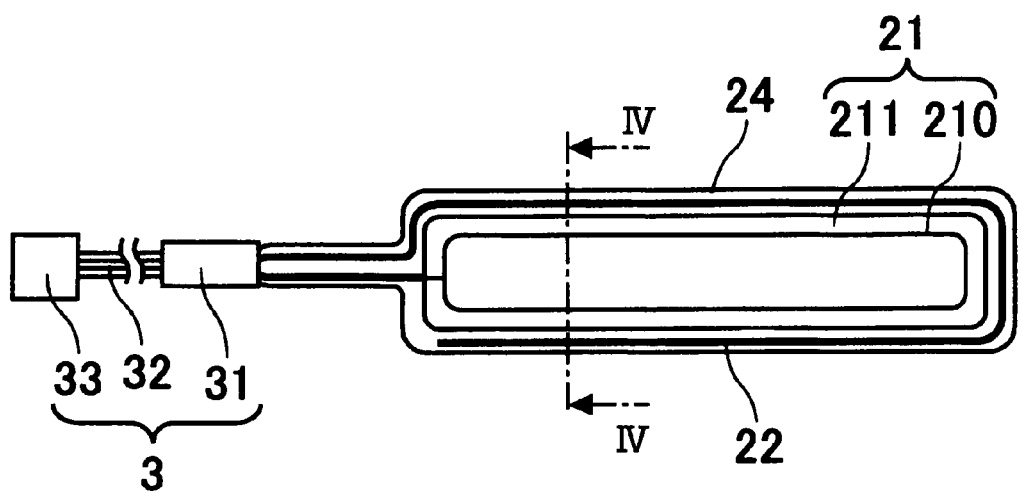
FIG. 3 is a diagram illustrating a top view of a sensor section and a connector section.
Figure 4:
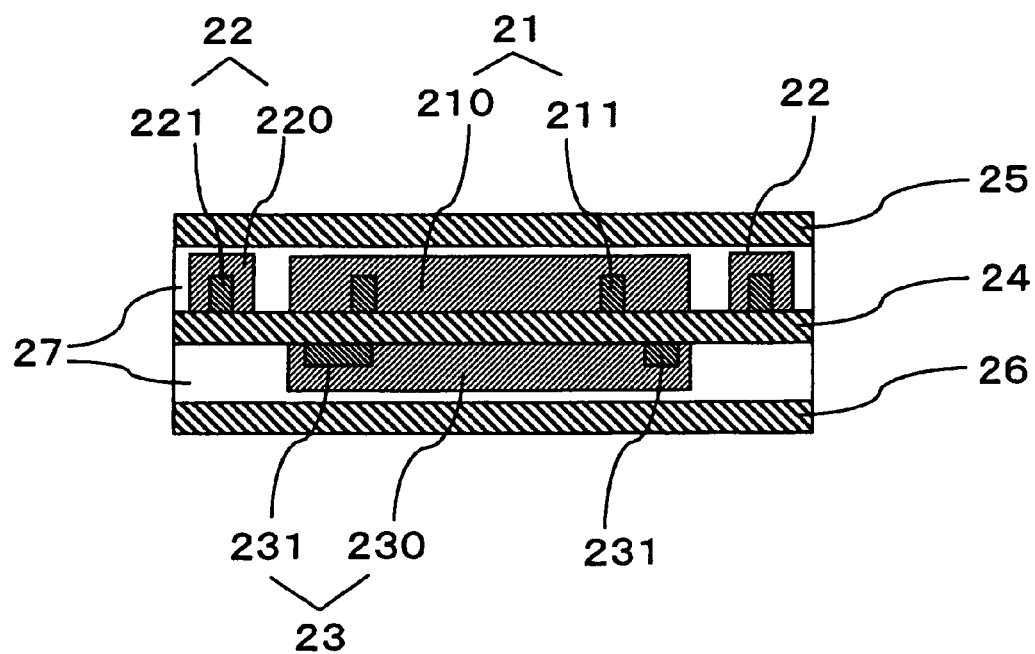
FIG. 4 is a is a diagram illustrating a cross sectional view taken along lines A-A in FIG. 3.

The constructions of the sensor section 2 and the connector section 3 will now be described in detail with reference to FIG. 3 and FIG. 4. FIG. 3 is a diagram showing a top view of the sensor section 2 and the connector section 3. FIG. 4 shows a sectional view taken along lines A-A in FIG. 3. FIG. 4 exaggerates a vertical width for the sake of convenience and for illustrative purposes As shown in FIG. 3 and FIG. 4, the sensor section 2 is a sheet-like unit member having the main electrode 21, the sub electrode 22, the guard electrode 23, a base film 24, an upper-layer film 25, and a lower-layer film 26. The connector section 3 includes a shield wire connection connector 31, a shield wire 32, and a switching section connection connector 33.

The base film 24, the upper-layer film 25, and the lower-layer film 26 are plate-shaped and are made of polyethylene terephthalate (PET). The films 24 through 26 are bonded with each other by an adhesive 27.

The main electrode 21 has a carbon electrode section 210 and a silver electrode section 211. The main electrode 21 is provided between the base film 24 and the upper-layer film 25. The main electrode 21 is provided approximately at the center of the base film 24. The carbon electrode section 210 is rectangular. The silver electrode section 211 is formed like a rectangular frame. The silver electrode section 211 is wired slightly inside an inner periphery of the carbon electrode section 210.

The sub electrode 22 includes a carbon electrode section 220 and a silver electrode section 221. The sub electrode 22 is provided between the base film 24 and the upper-layer film 25. The sub electrode 22 is provided outside the main electrode 21 separated from it. That is, the sub electrode 22 is provided so as to be apart from and adjacently to the main electrode 21. The carbon electrode section 220 is curved so as to surround an outside periphery of the main electrode 21. The silver electrode section 221 is provided approximately at the center along a width direction of the carbon electrode section 220. The silver electrode section 221 is wired in a longitudinal direction of the carbon electrode section 220.

The carbon electrode 23 has a carbon electrode section 230 and a silver electrode section 231. The guard electrode 23 is provided between the base film 24 and the lower-layer film 26 so as to be opposite to the main electrode 21. The carbon electrode section 230 is rectangular. The silver electrode section 231 is formed like a rectangular frame. The silver electrode section 231 is wired slightly inside an inner periphery of the carbon electrode section 230. The main electrode 21 and the guard electrode 23 are separated by the base film 24 and are insulated from each other.

The shield wire connection connector 31 and the switching section connection connector 33 are provided at the rear of the seat. The main electrode 21, the sub electrode 22, and the guard electrode 23 are connected to the shield wire connection connector 31 through a through-hole (not shown) in the seat. The shield wire connection connector 31 is connected to the switching section connection connector 33 via the shield wire 32. The switching section connection connector 33 connects with the switching section 4 of the Z detection section 14.

The occupant detection mode and the wetting detection mode in the capacitance-based occupant detection system 1 will now be described with reference to FIG. 5A through FIG. 13.

Figure 6:
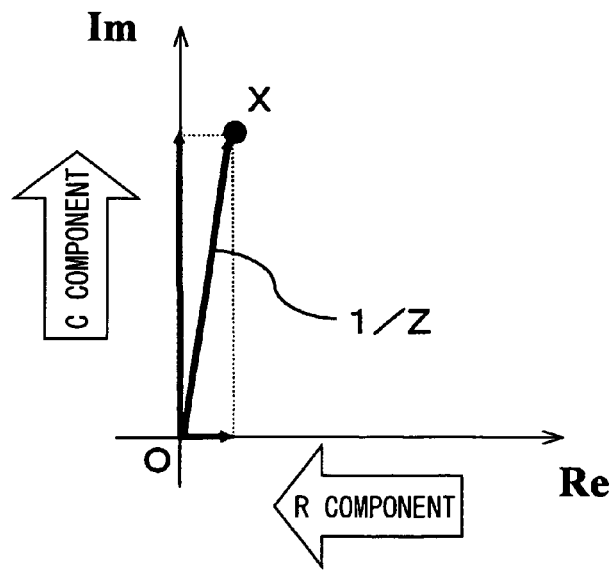
FIG. 6 is a graph with real (Re) and imaginary (Im) axes illustrating the Im-Re characteristics of exemplary impedance Z.
Figure 7:
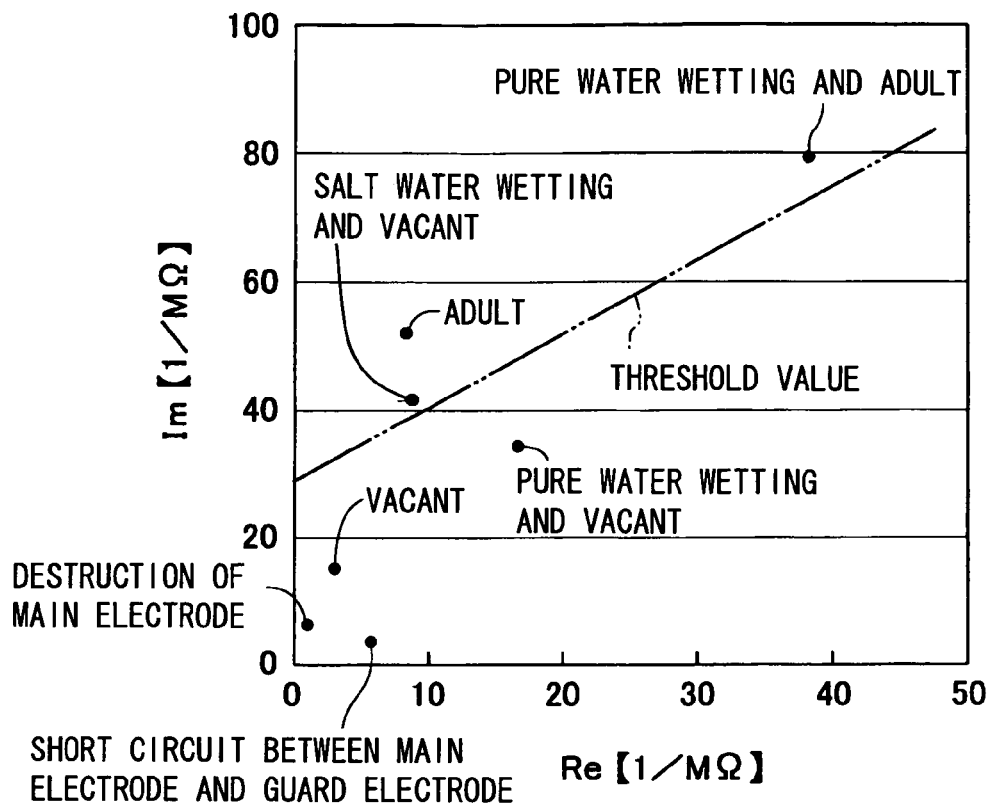
FIG. 7 is a graph illustrating an exemplary detection result in the occupant detection mode.

The occupant detection mode, referring to the graphs of FIG. 6 and FIG. 7, determines whether or not an occupant sits on the seat or how an occupant is seated. In addition, the occupant detection mode can determine the presence or absence of failures such as destruction of the main electrode 21, short-circuiting between the main electrode 21 and the guard electrode 23, and excessive wetting of the seat.

Figure 5A:
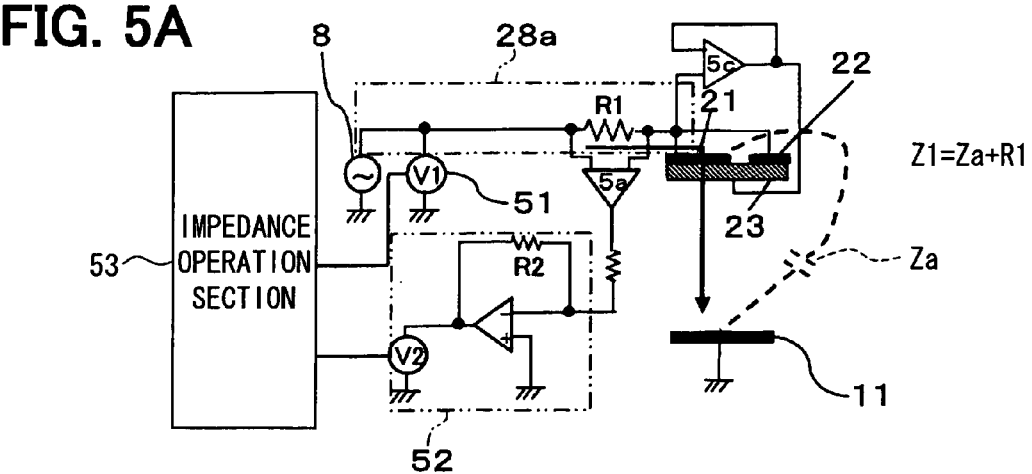
FIG. 5A is a schematic diagram illustrating an exemplary circuit in occupant detection mode.

The switching section 4 is used to switch the occupant detection mode to the wetting detection mode. That is, the switching section 4 connects the common terminal of switches 41 and 42 respectively to the side a pole to enable the capacitance-based occupant detection system 1 in the occupant detection mode. FIG. 5A shows the resulting circuit when switches 41 and 42 in the switching section are connected to the side a pole.

In the occupant detection mode, as shown in FIG. 5A, the power supply section 8 supplies an AC voltage to the main electrode 21 to generate an electric field between the main electrode 21 and the vehicle body 12. In addition, the third operational amplifier 5c provides an equal electric potential for the main electrode 21 and the guard electrode 23. Similarly to the main electrode 21, the power supply section 8 supplies an AC voltage also to the sub electrode 22. The voltage detection section 51 detects AC voltages generated by the power supply section 8.

When the seat is vacant, there is air between the main electrode 21 and the vehicle body 12. When an occupant sits on the seat, there is a human body between the main electrode 21 and the vehicle body 12. Compared to the vacant seat, a change is made to capacitance and resistance components between the main electrode 21 and the vehicle body 12.

The arrow in FIG. 5A indicates one flow such as a positive current flow of an AC current. That is, the current flows from the power supply section 8, the main wiring section 28a, the main electrode 21, and then to the vehicle body forming an occupant detection circuit. The current detection section 52 detects a current changed by the occupant seating, such as a current flowing through the first resistor R1. The main wiring section 28a ranges from the power supply section 8 to the main electrode 21 through the first resistor R1.

In the occupant detection mode, the impedance operation section 53 calculates impedance Z1 of the occupant detection circuit from a voltage detected by the voltage detection section 51 and a current detected by the current detection section 52. That is, the impedance calculation section 5 calculates the first impedance Z1 containing main-body impedance Za, such as an impedance between the main electrode 21 and the vehicle body 12.

The first impedance Z1 contains the impedance Za between the main electrode 21 and the vehicle body. As noted above, a human body, air, a CRS, or other object placed between the electrodes contain not only capacitive components but also resistive components. In terms of an equivalent circuit, the impedance Za is attributed to a parallel circuit having a capacitance and a resistance.

The Re/Im part calculation section 6 decomposes the first impedance Z1 into real and imaginary parts. The first impedance Z1 is expressed in accordance with Equation 1.

$$Z1=1/(Re+(j \cdot Im)) \qquad (1)$$

using the real part (Re) and the imaginary part (Im).

With reference to FIG. 6, the following describes the relationship between real part (Re) and imaginary part (Im) in the first impedance Z1. As mentioned above, FIG. 6 shows Im-Re characteristics of 1/Z, which is the inverse of the impedance, where the horizontal axis represents Re [1/MΩ] and the vertical axis represents Im [1/MΩ]. The Re value relates to a resistance component (R component) and decreases as the resistance component increases. The Im value relates to a capacitance component (C component) and increases as the capacitance component increases. The Re and Im values for the impedance Z determine coordinate X for the Im-Re characteristics. As shown in FIG. 6, a vector from origin 0 to coordinate X represents the inverse of the impedance 1/Z. The length of the illustrated vector represents the size of 1/Z.

In the occupant detection mode, the determination section 7 determines the presence of an occupant on the seat based on the imaginary and real parts of the first impedance Z1 calculated by the Re/Im part calculation section 6. FIG. 7 shows a detection result in the occupant detection mode. The horizontal axis represents the real part (Re) of the first impedance Z1. The vertical axis represents the imaginary part (Im) of Z1. The dash-double-dot line represents a threshold value for determining whether or not an occupant sits on the seat. The threshold value is so configured that imaginary part (Im) linearly increases as real part (Re) increases.

As shown in FIG. 7, the real and imaginary parts when an adult occupant is seated in comparison with the vacant seat. In particular, the imaginary part becomes much larger. In FIG. 7, results are found below the threshold value when the seat is vacant. Results are found above the threshold value when the adult occupant is seated. Accordingly, the determination section 7 can use values of the real and imaginary parts for the first impedance Z1 to determine whether or not an adult occupant is seated. It is possible to more accurately determine the presence of an occupant.

The embodiment uses the threshold value that allows the real and imaginary parts to maintain linear relationship. Since such threshold value is used, only the occupant detection mode can accurately determine an occupant when the seat is wet with pure water, or the like, such as liquid that is approximate to pure water, but not salt water. As shown in FIG. 7, the pure water wetting increases the real part and the imaginary part of the first impedance Z1 independently of whether the seat is vacant or occupied. Even in the illustrated case, as shown in FIG. 7, the pure water wetting is positioned below the threshold value when the seat is vacant, and above the threshold value when the seat is occupied by the adult occupant.

When the seat is wet with salt water, or the like, the imaginary part of the first impedance Z1 is larger than that for the pure water wetting. In FIG. 7, the vacant seat wet with salt water is positioned above the threshold value. Accordingly, the salt water wetting makes it impossible to determine whether or not the seat is occupied by an occupant.

The guard electrode 23 generates an electric field against the seat frame 11. When the seat is vacant, the guard electrode 23 is provided between the main electrode 21 and the seat frame 22 at the same electric potential as the main electrode 21. The capacitance between the main electrode 21 and the seat frame 11 is canceled or reduced as described for example in JP-2006-201129 A.

Figure 8:
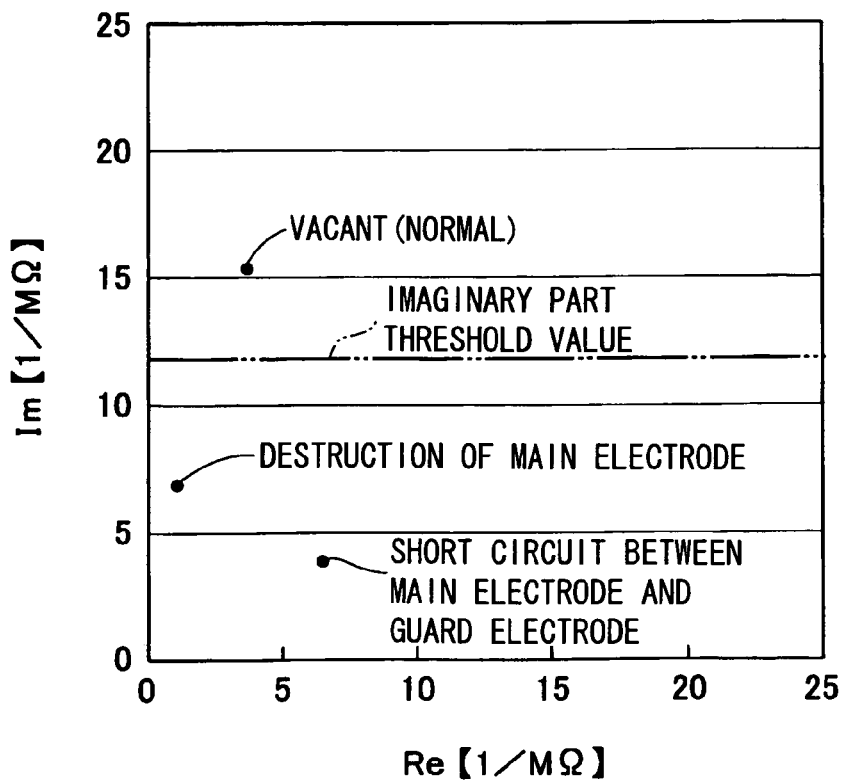
FIG. 8 is a graph illustrating exemplary results indicating destruction of a main electrode and a result of detecting short-circuiting between the main electrode and a guard electrode in the occupant detection mode.
Figure 9:
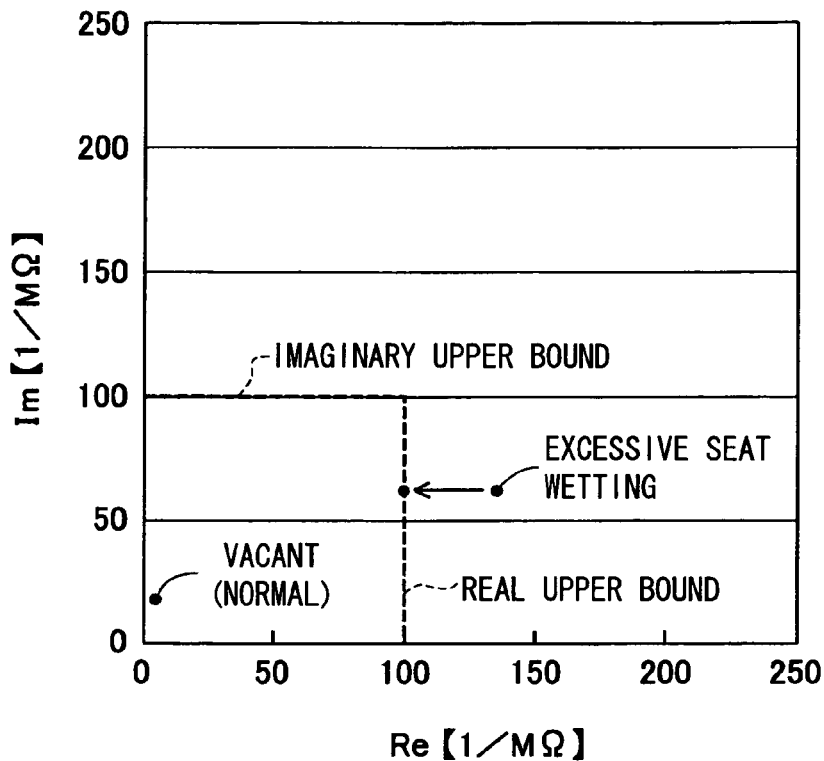
FIG. 9 is a graph illustrating an exemplary result associated with detecting excessive wetting of a seat in the occupant detection mode.

With reference to FIG. 8 and FIG. 9, failures that can be detected in the occupant detection mode include destruction of the main electrode 21, short-circuiting between the main electrode 21 and the guard electrode 23, and excessive wetting of the seat. Destruction of the main electrode 21 includes, for example, damage, cracking, or disconnection in the main electrode 21, such as the carbon electrode section 210 and the silver electrode section 211, and line disconnection in the silver electrode section 211. FIG. 8 and FIG. 9 show results of detecting above-mentioned failures in the occupant detection mode. The horizontal axis represents the real part (Re) of the first impedance Z1. The horizontal axis represents the imaginary part (Im) thereof.

The following describes destruction of the main electrode 21 and short-circuiting between the main electrode 21 and the guard electrode 23. As shown in FIG. 8, the real part (Re) approximates to 3 [1/MΩ] and the imaginary part (Im) approximates to 15 [1/MΩ] in a normal state, such as a vacant seat state. When the main electrode 21 is destroyed, the real part (Re) approximates to 1 [1/MΩ] and the imaginary part (Im) approximates to 7 [1/MΩ]. When a short circuit occurs between the main electrode 21 and the guard electrode 23, the real part (Re) approximates to 6 [1/MΩ] and the imaginary part (Im) approximates to 4 [1/MΩ].

In the occupant detection mode, the imaginary part threshold value is smaller than the equivalent (15 [1/MΩ]) for the vacant seat as the normal state. The embodiment uses a value of Im=12 [1/MΩ] as the imaginary part threshold value in the occupant detection mode. Therefore, the impedance value in the normal state is above the imaginary part threshold value. That is, the imaginary part in the normal state is larger than the imaginary part threshold value. When the main electrode 21 is destroyed or a short circuit occurs between the main electrode 21 and the guard electrode 23, the normal state impedance drops to a value below the imaginary part threshold value. That is, the imaginary part in the failure state is smaller than the imaginary part threshold value. When the imaginary part of the calculated first impedance Z1 is smaller than the imaginary part threshold value, the determination section 7 determines that the main electrode 21 is destroyed or a short circuit occurs between the main electrode 21 and the guard electrode 23.

In the occupant detection mode, the determination section 7 can use the imaginary part of the calculated first impedance Z1 to accurately determine whether or not the main electrode 21 is destroyed or a short circuit occurs between the main electrode 21 and the guard electrode 23.

The following describes excessive wetting of the seat. When the seat such as the seating surface section 9 is excessively wet, for example, the real and imaginary parts of the first impedance Z1 vary as shown in FIG. 9. The broken line in FIG. 9 represents a calculation range predetermined for the Re/Im part calculation section 6 in the occupant detection mode. That is, the embodiment settles the range of real and imaginary parts calculated by the Re/Im part calculation section. In the calculation range, an upper bound from the real part is referred to as a real upper bound and an upper bound for the imaginary part is referred to as an imaginary upper bound hereafter. The embodiment assigns 100 [1/MΩ] to each of the real upper bound and the imaginary upper bound in the occupant detection mode. FIG. 9 also shows values outside the calculation range so as to indicate measurement values calculated when the seat is actually wet excessively.

When the seat is wet excessively, the real part (Re) approximates to 140 [1/MΩ] and the imaginary part (Im) approximates to 60 [1/MΩ]. When the real part to be calculated exceeds the real upper bound according to the embodiment, the real part is calculated as the real upper bound. In FIG. 9, the Re/Im part calculation section 6 calculates the real part (Re) equal to 100 [1/MΩ] and the imaginary part (Im) approximate to 60 [1/MΩ].

In the occupant detection mode, the embodiment sets the real part threshold value Re=100 [1/MΩ]. That is, the real upper bound is used as the real part threshold value. The real part in the normal state becomes smaller than the real part threshold value. When the seat is excessively wet, the real part is found on the real part threshold value, such as the real upper bound as previously described. That is, the real part is greater than or equal to the real part threshold value. Accordingly, the determination section 7 determines the excessive seat wetting when the real part of the calculated first impedance Z1 is greater than or equal to the real part threshold value. According to the embodiment, the determination section 7 determines the excessive seat wetting when the real part (Re) reaches the real upper bound.

The occupant detection mode according to the embodiment is associated with an imaginary part threshold value of Im=12 [1/MΩ] and a real part threshold value set to the real upper bound of Re=100 [1/MΩ] and a failure can thereby be accurately determined, as mentioned above, based on the real and imaginary parts of the first impedance Z1.

With reference to FIG. 5B, and FIG. 10 through FIG. 13, the following describes the wetting detection mode. The wetting detection mode chiefly determines whether the seat is wet. In particular, the wetting detection mode determines the presence or absence of salt water wetting that cannot be determined in the occupant detection mode. In addition, the wetting detection mode determines destruction of the main electrode 21, destruction of the sub electrode 22, short-circuiting between the main electrode 21 and the guard electrode 23, short-circuiting between the sub electrode 21 and the sub electrode 22, and the presence or absence of excessive seat wetting as will de described in greater detail hereinafter.

Figure 5B:
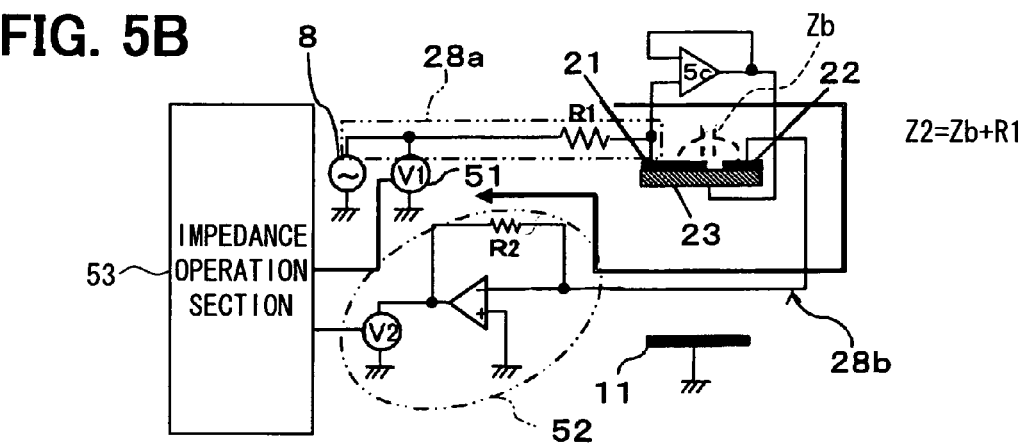
FIG. 5B is a schematic diagram illustrating an exemplary circuit diagram in wetting detection mode.
Figure 10:
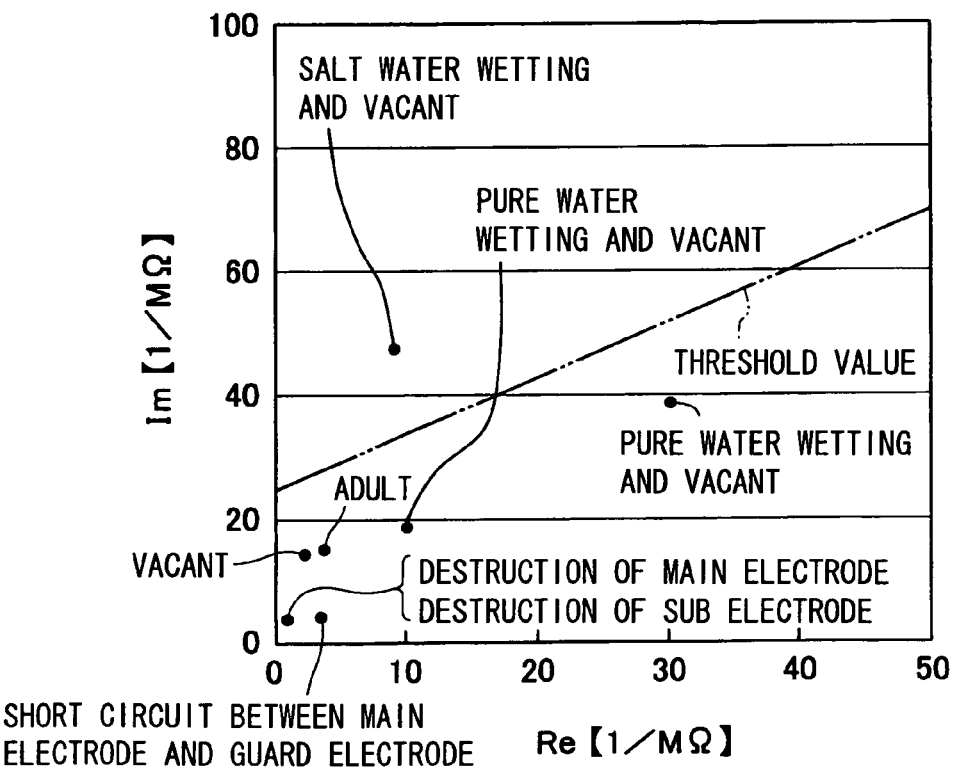
FIG. 10 is a graph illustrating an exemplary result associated with detecting wetting in the wetting detection mode.

With reference to FIG. 5B and FIG. 10, the following describes the determination of wetting in the wetting detection mode. The switching section 4 switches the occupant detection mode to the wetting detection mode. That is, the switching section 4 connects the first switch 41 and the second switch 42 to side b pole in order to enable the wetting detection mode of the capacitance-based occupant detection system 1. FIG. 5B is a circuit diagram showing the switching section 4 with the first switch 41 and the second switch 42 connected to side b pole.

As shown in FIG. 5B, the sub electrode 22 is connected to the current detection section 52. An electric field is formed between the main electrode 21 and the sub electrode 22. In terms of an equivalent circuit, a main-sub impedance Zb between the main electrode 21 and the sub electrode 22 can be characterized as a parallel circuit of a capacitance and a resistance. When liquid such as pure water or salt water exists between the electrodes during wetting, a change is made to capacitance and resistance components therebetween. The current detection section 52 detects a current change. The arrow in FIG. 5B indicates one cycle of flow, such as a positive current, of an AC current. That is, the current flows from the power supply section 8, the main wiring section 28a, the main electrode 21, the sub electrode 22, the sub wiring section 28b, and then to the vehicle ground forming a wetting detection circuit. The current detection section 52 detects a current flowing through the second resistor R2. The sub wiring section 28b ranges from the sub electrode 22 to the vehicle ground.

In the wetting detection mode, the impedance operation section 53 calculates a second impedance Z2 of the wetting detection circuit from a voltage detected by the voltage detection section 51 and a current detected by the current detection section 52. That is, the impedance calculation section 5 calculates a second impedance Z2 containing the main-sub impedance Zb between the main electrode 21 and the sub electrode 22.

Similarly to the occupant detection mode, the Re/Im part calculation section 6 calculates the real and imaginary parts for the second impedance Z2. Based on the real and imaginary parts, the determination section 7 determines seat wetting and the presence or absence of a failure as mentioned above.

FIG. 10 shows a result of detecting wetting in the wetting detection mode. The horizontal axis represents the real part (Re). The vertical axis represents the imaginary part (Im). The dash-double-dot line represents a threshold value for determining whether or not the seat is wet due to salt water wetting according to the present embodiment. The threshold value is so configured that imaginary part (Im) linearly increases as real part (Re) increases.

In FIG. 10, the result exceeds the threshold value in the case of the salt water wetting. The results are smaller than the threshold value in the other cases than the salt water wetting, such as when the seat is vacant, when an adult occupant is seated, and when an occupant is seated under the condition of pure water wetting. Accordingly, the determination section 7 can use values of the real and imaginary parts for the second impedance Z2 to detect whether or not the seat is wet due to salt water wetting.

In the event of pure water wetting other than salt water, the embodiment enables the occupant determination in the occupant detection mode independently of detection in the wetting detection mode. For this reason, the wetting detection mode according to the embodiment uses a threshold value so as to be able to determine the salt water wetting making it possible to prevent erratic determination in the occupant detection mode due to salt water wetting. Also in the wetting detection mode, properly setting a threshold value makes it possible to determine not only salt water wetting but also pure water wetting.

Figure 11:
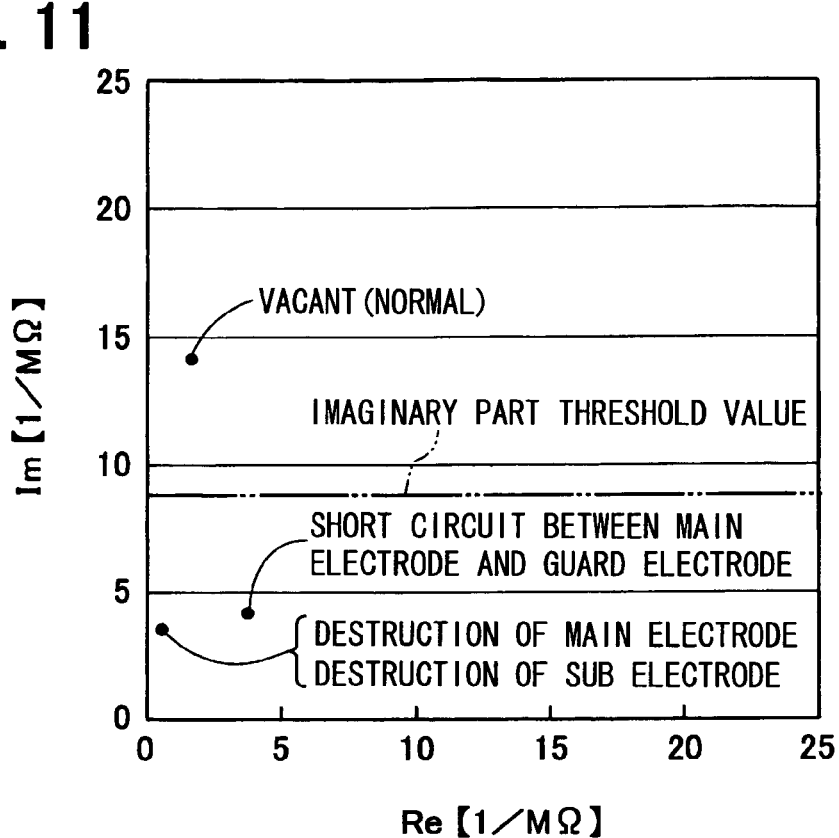
FIG. 11 is a graph illustrating an exemplary result associated with detecting destruction of the main electrode, destruction of a sub-electrode, and short-circuiting between the main electrode and the guard electrode.
Figure 12:
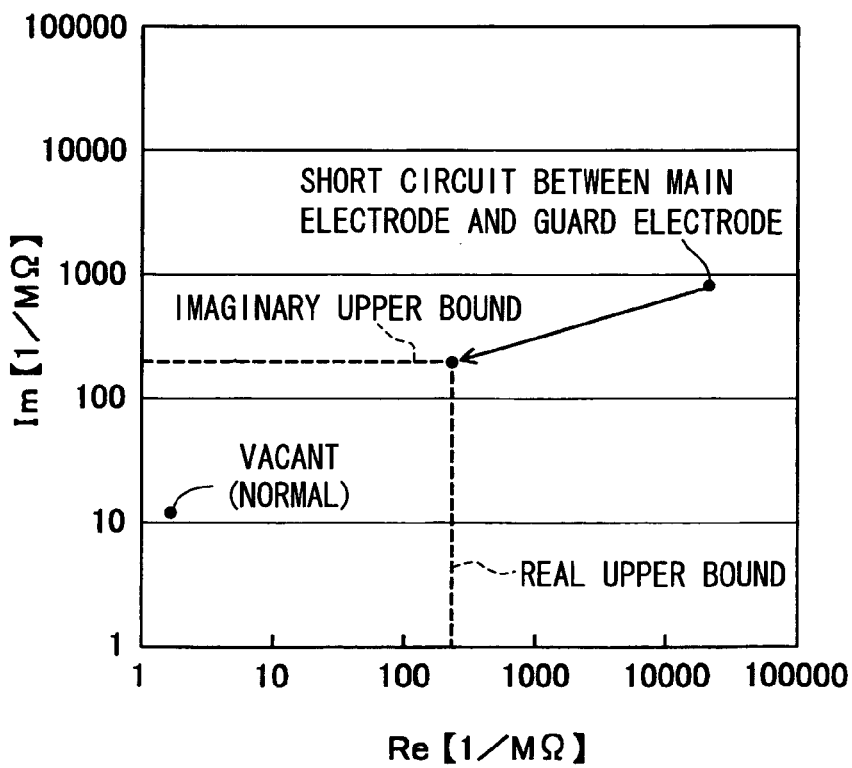
FIG. 12 is a graph illustrating an exemplary result associated with detecting short-circuiting between the main electrode and the sub-electrode in the wetting detection mode.
Figure 13:
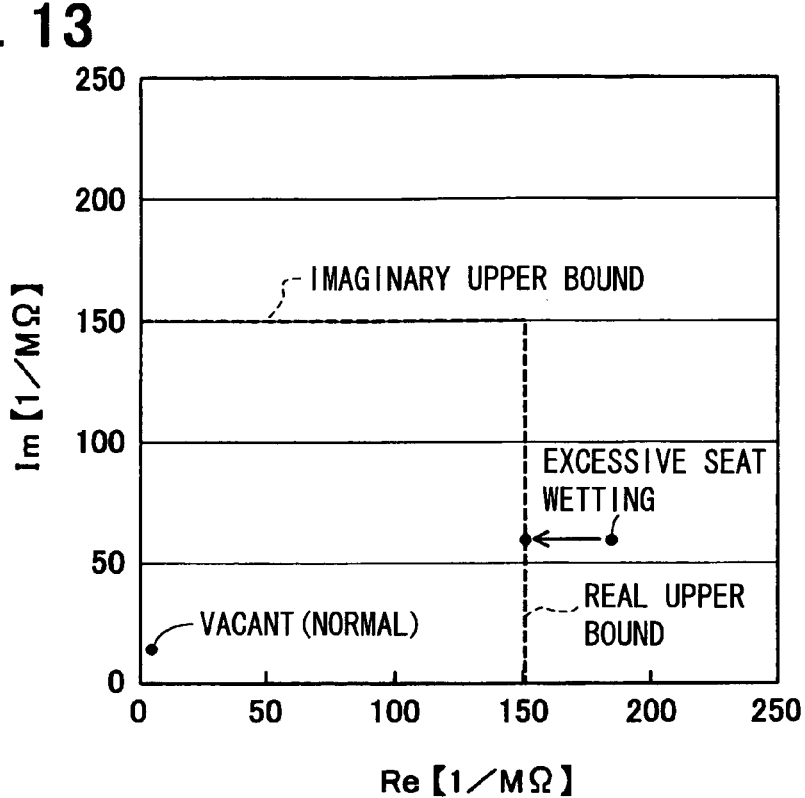
FIG. 13 is a graph illustrating an exemplary result associated with detecting excessive wetting of a seat in the wetting detection mode.

With reference to FIG. 11 through FIG. 13, the following describes determination of failures on the wetting detection circuit in the wetting detection mode. The failures include destruction of the main electrode 21, destruction of the sub electrode 22, short-circuiting between the main electrode 21 and the guard electrode 23, short-circuiting between the main electrode 21 and the sub electrode 22, and excessive seat wetting. FIG. 11 through FIG. 13 shows results of detecting above-mentioned failures in the wetting detection mode. The horizontal axis represents the real part (Re) of the second impedance Z2. The horizontal axis represents the imaginary part (Im) thereof.

The following describes destruction of the main electrode 21, destruction of the sub electrode 22, and short-circuiting between the main electrode 21 and the guard electrode 23. As shown in FIG. 11, the real part (Re) approximates to 2 [1/MΩ] and the imaginary part (Im) approximates to 14 [1/MΩ] in a normal state. When the main electrode 21 or the sub electrode 22 is destroyed, the real part (Re) approximates to 1 [1/MΩ] and the imaginary part (Im) approximates to 3 [1/MΩ]. When a short circuit occurs between the main electrode 21 and the guard electrode 23, the real part (Re) approximates to 4 [1/MΩ] and the imaginary part (Im) approximates to 4 [1/MΩ].

In the wetting detection mode, the imaginary part threshold value is smaller than the equivalent (14 [1/MΩ]) for the vacant seat as the normal state. The embodiment uses Im=8 [1/MΩ] as the imaginary part threshold value in the wetting detection mode. Therefore, the normal state is located above the imaginary part threshold value. That is, the imaginary part in the normal state is larger than the imaginary part threshold value. The normal state is located below the imaginary part threshold value when the main electrode 21 is destroyed, the sub electrode 22 is destroyed, and a short circuit occurs between the main electrode 21 and the guard electrode 23. That is, the imaginary part in the failure state is smaller than the imaginary part threshold value. When the imaginary part of the calculated second impedance Z2 is smaller than the imaginary part threshold value, the determination section 7 determines that above-mentioned failures occur.

In the wetting detection mode, the determination section 7 can use the imaginary part of the calculated second impedance Z2 to accurately determine whether or not the main electrode 21 is destroyed, the sub electrode 22 is destroyed, or a short circuit occurs between the main electrode 21 and the guard electrode 23.

The following describes a short circuiting between the main electrode 21 and the sub electrode 22 and excessive seat wetting. As indicated by the broken lines in FIG. 12 and FIG. 13, the Re/Im part calculation section 6 is previously assigned with a calculation range including a real upper bound and an imaginary upper bound, in the wetting detection mode. FIG. 12 uses a logarithmic graph for indicating measurement values. Similarly to the occupant detection mode, the Re/Im part calculation section 6 calculates the real part of the second impedance Z2 as a real upper bound when the real part exceeds the real upper bound. The Re/Im part calculation section 6 calculates the imaginary part as an imaginary upper bound when the imaginary part exceeds the imaginary upper bound. The embodiment sets the real upper bound and the imaginary upper bound to 150 [1/MΩ] in the wetting detection mode.

As shown in FIG. 12 and FIG. 13, the real part (Re) approximates to 2 [1/MΩ] and imaginary part (Im) approximates to 14 [1/MΩ] in the normal state as mentioned above. FIG. 12 shows a short circuit between the main electrode 21 and the sub electrode 22. Real part (Re) approximates to 10000 [1/MΩ] and imaginary part (Im) approximates to 1000 [1/MΩ]. Since these exceed the upper bounds, real part (Re) is calculated as 150 [1/MΩ] and imaginary part (Im) is calculated as 150 [1/MΩ].

As shown in FIG. 13, real part (Re) approximates to 180 [1/MΩ] and imaginary part (Im) approximates to 60 [1/MΩ] in the event of excessive seat wetting. Since the real part exceeds the real upper bound in this case, the Re/Im part calculation section 6 calculates the real part as 150 [1/MΩ].

In the wetting detection mode, the real part threshold value is set to Re=150 [1/MΩ]. That is, the real part threshold value equals the real upper bound. The real part is smaller than the real part threshold value in the normal state. The real part is positioned on the real part threshold value such as the real upper bound when a short circuit occurs between the main electrode 21 and the sub electrode 22 or the excessive seat wetting occurs. That is, the real part becomes greater than or equal to the real part threshold value in the event of excessive seat wetting. Accordingly, the determination section 7 determines the excessive seat wetting when the real part of the calculated second impedance Z2 is greater than or equal to the real part threshold value.

The wetting detection mode according to the embodiment sets the imaginary part threshold value to Im=8 [1/MΩ] and the real part threshold value as the real upper bound to Re=150 [1/MΩ]. The determination section 7 accurately determines above-mentioned failures based on the real and imaginary parts of the second impedance Z2.

A short circuit between the main electrode 21 and the sub electrode 22 can be determined by the fact that the imaginary part exceeds the imaginary upper bound of Im=150 [1/MΩ]. The determination section 7 can also determine a short circuit when the imaginary part is found on the imaginary upper bound. Further, the imaginary upper bound is assumed to be the imaginary part threshold value. The short circuit can be determined when the imaginary part is greater than or equal to the imaginary part threshold value. For example, a short circuit between the main electrode 21 and the sub electrode 22 can be determined when the second impedance Z2 is calculated on the upper bounds (Re=150 and Im=150). The excessive seat wetting can be determined when the second impedance Z2 is calculated only on the real upper bound.

Figure 14:
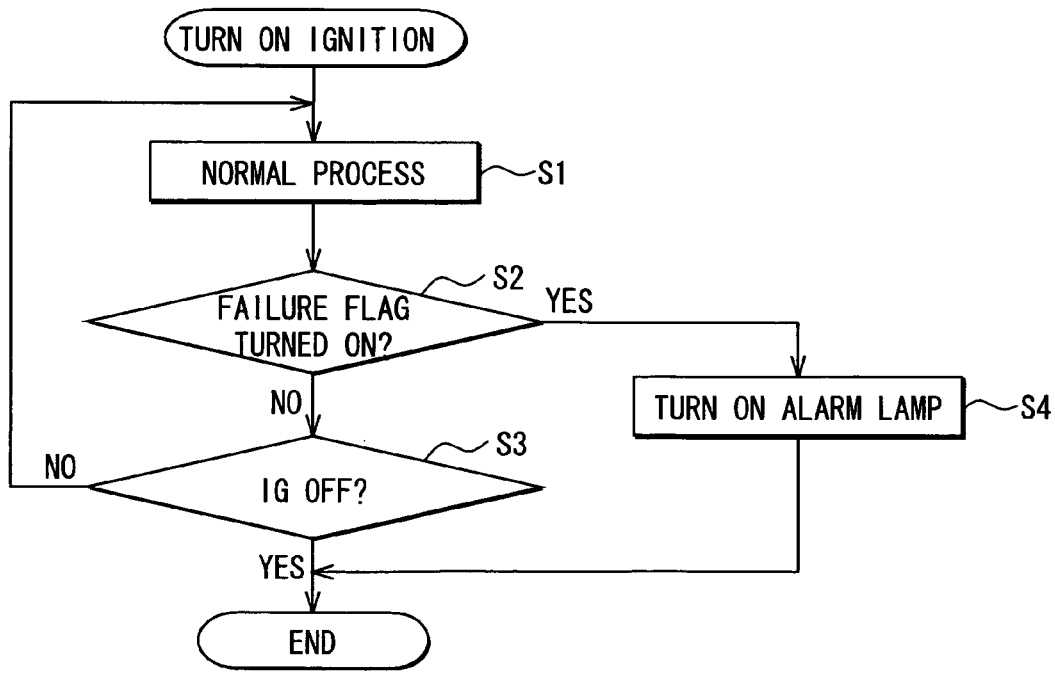
FIG. 14 is a flowchart illustrating an exemplary main process associated with various embodiments.
Figure 15:
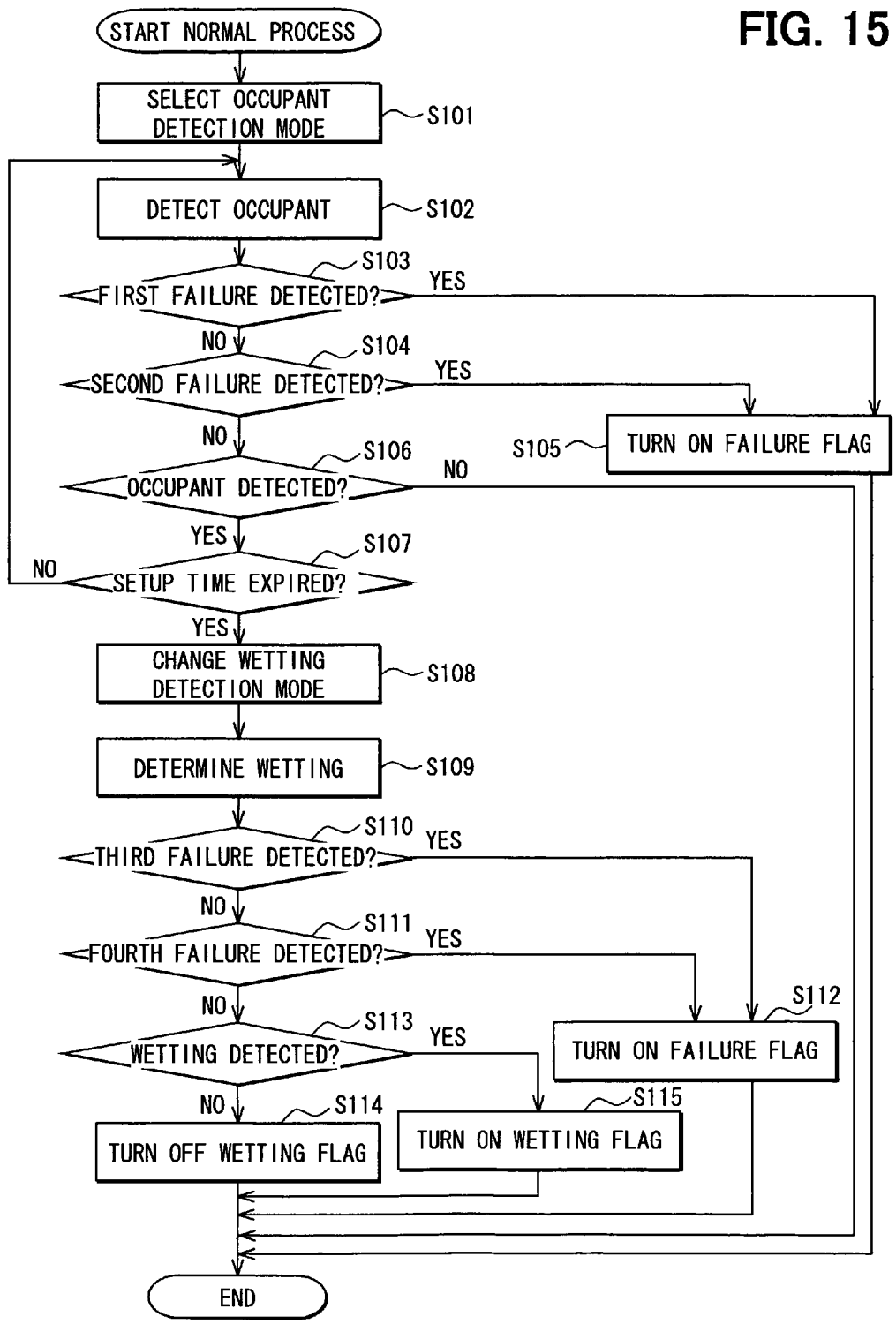
FIG. 15 is a flowchart illustrating an exemplary normal process associated with various embodiments.

With reference to FIG. 14 and FIG. 15, the following describes the overall system process using the capacitance-based occupant detection system 1. FIG. 14 is a flowchart showing a main process of the system. FIG. 15 is a flowchart showing a normal process. The following description assumes first through fourth failures. The first failure signifies the excessive seat wetting in the occupant detection mode. The second failure signifies destruction of the main electrode 21 and a short circuit between the main electrode 21 and the guard electrode 23 in the occupant detection mode. The third failure signifies the excessive seat wetting and a short circuit between the main electrode 21 and the sub electrode 22 in the wetting detection mode. The fourth failure signifies destruction of the main electrode 21, destruction of the sub electrode 22, and a short circuit between the main electrode 21 and the guard electrode 23 in the wetting detection mode.

As shown in FIG. 14, turning on a vehicle ignition (IG) starts an operation of the capacitance-based occupant detection system 1 to perform a normal process at S1.

In the normal process, as shown in FIG. 15, the switching section 4 selects the occupant detection mode at S101. The process determines the presence of an occupant in the occupant detection mode as mentioned above at S102 during an occupant detection process. The process determines the presence or absence of the first failure at S103. When the first failure is detected corresponding to YES at S103, a failure flag is turned on at S105 to terminate the normal process. When the first failure is not detected corresponding to NO at S103, the process determines the presence or absence of the second failure at S104. When the second failure is detected corresponding to YES at S104, the first failure is turned on at S105. The normal process terminates. When the second failure is not detected corresponding to NO at S104, the process determines the presence or absence of an occupant at S106.

When no occupant is detected corresponding to NO at S106, the normal process terminates. When an occupant is detected corresponding to YES at S106, the information is transmitted to the air bag ECU 16 from the occupant detection ECU 15 so that the air bag 17 can be inflated. That is, the air bag 18 is inflated when it is enabled to be inflated and the vehicle collides. The process determines whether or not a setup time interval preset to the occupant detection ECU 15 expires at S107. When the setup time interval does not expire corresponding to NO at S106, the process transmits the detected information to the air bag ECU and returns to the occupant detection process at S102.

After the occupant is detected corresponding to YES at S106 and the setup time expires corresponding to YES at S107, the switching section 4 changes the occupant detection mode to the wetting detection mode at S108. The process then determines wetting in the wetting detection mode at S109 during a wetting detection process. The process determines the presence or absence of the third failure at S110. When the third failure is detected corresponding to YES at S110, the failure flag is turned on at S112. The normal process terminates. When the third failure is not detected corresponding to NO at S110, the process determines presence or absence of the fourth failure at S111. When the fourth failure is detected corresponding to YES at S111, the failure flag is turned on at S112. The normal process terminates. When the fourth failure is not detected corresponding to NO at S111, the process determines presence or absence of wetting at S113.

When the wetting is detected corresponding to YES at S113, a wetting flag turns on at S115. The normal process terminates. The wetting flag is used to notify wetting and determine an occupant in consideration for its effect. According to the embodiment, the wetting flag is used to detect salt water wetting and reflect the information, such as that the wetting flag turned on, in the determination of an occupant. When no wetting is detected corresponding to NO at S113, the wetting flag is turned off at S114. The normal process terminates.

Returning to FIG. 14, after completion of the normal process, the main process determines whether or not the failure flag is turned on at S2. When the failure flag is turned on corresponding to YES at S2, the occupant detection ECU 15 turns on an alarm lamp at S4. Operations of the capacitance-based occupant detection system 1 terminate. When the failure flag is not turned on corresponding to NO at S2, the process determines whether or not the ignition is turned off at S3. When the ignition is turned on corresponding to NO at S3, control returns to the normal process. The process is repeated. When the ignition is turned off corresponding to YES at S3, the capacitance-based occupant detection system 1 terminates. The failure flags can be assigned to the first through fourth failures for identifying the failures.

As mentioned above, the capacitance-based occupant detection system 1 according to the embodiment can accurately determine the first and second failures in the occupant detection mode and the third and fourth failures in the wetting detection mode. Using the above-mentioned determination results, the occupant protection system 100 can prevent malfunctions due to failures and accurately control the occupant protection apparatus.

Each mode can use only the imaginary part to determine the presence or absence of electrode destruction and a short circuit between main electrode 21 and the guard electrode 23. The real and imaginary parts may be used for the determination. Each mode can use only the imaginary part to determine the presence or absence of the excessive seat wetting. The real and imaginary parts may be used for the determination. The real and imaginary parts of calculated impedances can be used to more improve the determination accuracy for above-mentioned failures. The determination of occupants and wetting is not limited to above-mentioned method but may use conventional determination methods based on current values etc. The capacitance-based occupant detection system 1 is not applied only to the occupant protection system 100.

What is claimed is:

1. A capacitance-based occupant detection system comprising:
    a power supply section for generating an AC voltage;
    a main electrode provided for a vehicle seat;
    a main wiring section for connecting the power supply section with the main electrode;
    a guard electrode provided between a seat frame electrically connected to a vehicle ground and the main electrode, the guard electrode apart from and opposite to the main electrode;
    an impedance calculation section for calculating a main-body impedance between the main electrode and a vehicle body in an occupant detection mode for ensuring an equal electric potential for the main electrode and the guard electrode and for generating an electric field between the main electrode and the vehicle body electrically connected to the vehicle ground;
    a Re/Im part calculation section for separating real and the imaginary parts of the main-body impedance based on the main-body impedance calculated by the impedance calculation section;
    a failure determination section for determining presence or absence of destruction of the main electrode or a short circuit between the main electrode and the guard electrode based on use of the separated imaginary part of the main-body impedance calculated by the Re/Im part calculation section; and
    an occupant determination section for determining the presence of an occupant on the seat in accordance with a determination result of the failure determination section in the occupant detection mode,
    wherein the failure determination section determines destruction of the main electrode or a short circuit between the main electrode and the guard electrode, when the separated imaginary part of the main-body impedance calculated by the Re/Im part calculation section in the occupant detection mode is smaller than a predetermined imaginary part threshold value.

2. A capacitance-based occupant detection system comprising:
    a power supply section for generating AC voltage;
    a main electrode provided for a vehicle seat;
    a main wiring section for connecting the power supply section with the main electrode;
    a guard electrode that is provided between a seat frame electrically connected to a vehicle ground and the main electrode, the guard electrode apart from and opposite to the main electrode;
    an impedance calculation section for calculating a main-body impedance between the main electrode and a vehicle body in an occupant detection mode for ensuring an equal electric potential for the main electrode and the guard electrode and generating an electric field between the main electrode and the vehicle body electrically connected to the vehicle ground;
    a Re/Im part calculation section for separating real and the imaginary parts of the main-body impedance based on the main-body impedance calculated by the impedance calculation section;
    a failure determination section for determining excessive wetting of the seat based on use of the separated real part of the main-body impedance calculated by the Re/Im part calculation section; and
    an occupant determination section for determining the presence of an occupant on the seat in accordance with a determination result of the failure determination section in the occupant detection mode, wherein the failure determination section determines excessive wetting of the seat, when the separated real part of the main-body impedance calculated by the Re/Im part calculation section is greater than or equal to a predetermined real part threshold value.

3. The capacitance-based occupant detection system according to claim 2, wherein the Re/Im part calculation section calculates the separated real part of the main-body impedance as a real upper bound, when a range of calculating the separated real part is settled and the separated real part of the main-body impedance exceeds the real upper bound of the range; and wherein the real part threshold value is set to the real upper bound.

4. A capacitance-based occupant detection system comprising:

a power supply section for generating AC voltage;
a main electrode provided for a vehicle seat;
a main wiring section for connecting the power supply section with the main electrode;
a guard electrode that is provided between a seat frame electrically connected to a vehicle ground and the main electrode, the guard electrode apart from and opposite to the main electrode;
a sub electrode provided apart from and adjacently to the main electrode;
an impedance calculation section for calculating a main-sub impedance between the main electrode and the sub electrode in a wetting detection mode for generating an electric field between the main electrode and the sub electrode;
a Re/Im part calculation section for separating real and the imaginary parts of the main-sub impedance based on the main-sub impedance calculated by the impedance calculation section;
a failure determination section for determining destruction of the main electrode, destruction of the sub electrode, or a short circuit between the main electrode and the guard electrode based on use of the separated imaginary part of the main-sub impedance calculated by the Re/Im part calculation section; and
an occupant determination section for determining the presence of an occupant on the seat in accordance with a determination result of the failure determination section in an occupant detection mode for ensuring an equal electric potential for the main electrode and the guard electrode and generating an electric field between the main electrode and the vehicle body electrically connected to the vehicle ground,
wherein the failure determination section determines destruction of the main electrode, destruction of the sub electrode, or a short circuit between the main electrode and the guard electrode, when the separated imaginary part of the main-sub impedance calculated by the Re/Im part calculation section in the wetting detection mode is smaller than a predetermined imaginary part threshold value.

5. A capacitance-based occupant detection system comprising:

a power supply section for generating AC voltage;
a main electrode provided for a vehicle seat;
a main wiring section for connecting the power supply section with the main electrode;
a guard electrode that is provided between a seat frame electrically connected to a vehicle ground and the main electrode, the guard electrode apart from and opposite to the main electrode;
a sub electrode provided apart from and adjacently to the main electrode;
an impedance calculation section for calculating a main-sub impedance between the main electrode and the sub electrode in a wetting detection mode for generating an electric field between the main electrode and the sub electrode;
a Re/Im part calculation section for separating real and the imaginary parts of the main-sub impedance based on the main-sub impedance calculated by the impedance calculation section;
a failure determination section for determining excessive wetting of the seat based on use of the separated real part of the main-sub impedance calculated by the Re/Im part calculation section; and
an occupant determination section for determining the presence of an occupant on the seat in accordance with a determination result of the failure determination section in an occupant detection mode for ensuring an equal electric potential for the main electrode and the guard electrode and generating an electric field between the main electrode and the vehicle body electrically connected to the vehicle ground,
wherein the failure determination section determines excessive wetting of the seat, when the separated real part of the main-sub impedance calculated by the Re/Im part calculation section in the wetting detection mode is greater than or equal to a predetermined real part threshold value.

6. The capacitance-based occupant detection system according to claim 5, wherein the Re/Im part calculation section calculates the separated real part of the main-sub impedance as a real upper bound, when a range of calculating the separated real part is settled and the separated real part of the main-sub impedance exceeds the real upper bound of the range; and wherein the real part threshold value is set to the real upper bound.

7. A capacitance-based occupant detection system comprising:

a power supply section for generating AC voltage;
a main electrode provided for a vehicle seat;
a main wiring section for connecting the power supply section with the main electrode;
a guard electrode that is provided between a seat frame electrically connected to a vehicle ground and the main electrode, the guard electrode apart from and opposite to the main electrode;
a sub electrode provided apart from and adjacently to the main electrode;
an impedance calculation section for calculating a main-sub impedance between the main electrode and the sub electrode in a wetting detection mode for generating an electric field between the main electrode and the sub electrode;
a Re/Im part calculation section for separating real and the imaginary parts of the second impedance based on the main-sub impedance calculated by the impedance calculation section;
a failure determination section for determining presence or absence of a short circuit between the main electrode and the sub electrode based on use of both of the separated real part and the separated imaginary part of the main-sub impedance calculated by the Re/Im part calculation section; and an occupant determination section for determining the presence of an occupant on the seat in accordance with a determination result of the failure determination section in an occupant detection mode for ensuring an equal electric potential for the main electrode and the guard electrode and generating an electric field between the main electrode and the vehicle body electrically connected to the vehicle ground, wherein the failure determination section further determines a short circuit between the main electrode and the sub electrode when the separated real part of the main-sub impedance calculated by the Re/Im part calculation section in the wetting detection mode is greater than or equal to a predetermined real part threshold value.

8. The capacitance-based occupant detection system according to claim 7, wherein the Re/Im part calculation section calculates the separated real part of the main-sub impedance as a real upper bound when a range of calculating the separated real part is settled and the separated real part of the main-sub impedance exceeds the real upper bound of the range; and wherein the real part threshold value is set to the real upper bound.

9. A capacitance-based occupant detection system comprising:

a power supply section for generating AC voltage;

a main electrode provided for a vehicle seat;

a main wiring section for connecting the power supply section with the main electrode;

a guard electrode that is provided between a seat frame electrically connected to a vehicle ground and the main electrode, the guard electrode apart from and opposite to the main electrode;

a sub electrode provided apart from and adjacently to the main electrode;

an impedance calculation section for calculating a main-sub impedance between the main electrode and the sub electrode in a wetting detection mode for generating an electric field between the main electrode and the sub electrode;

a Re/Im part calculation section for separating real and the imaginary parts of the second impedance based on the main-sub impedance calculated by the impedance calculation section;

a failure determination section for determining presence or absence of a short circuit between the main electrode and the sub electrode based on use of both of the separated real part and the separated imaginary part of the main-sub impedance calculated by the Re/Im part calculation section; and an occupant determination section for determining the presence of an occupant on the seat in accordance with a determination result of the failure determination section in an occupant detection mode for ensuring an equal electric potential for the main electrode and the guard electrode and generating an electric field between the main electrode and the vehicle body electrically connected to the vehicle ground, wherein the failure determination section further determines a short circuit between the main electrode and the sub electrode, when the separated imaginary part of the main-sub impedance calculated by the Re/Im part calculation section in the wetting detection mode is greater than or equal to a predetermined imaginary part threshold value.

10. The capacitance-based occupant detection system according to claim 9, wherein the Re/Im part calculation section calculates the separated imaginary part of the main-sub impedance as an imaginary upper bound when a range of calculating the separated imaginary part is specified and the separated imaginary part of the main-sub impedance exceeds the imaginary upper bound of the range; and wherein the imaginary part threshold value is set to the imaginary upper bound.

* * * * *